UNITED STATES PATENT OFFICE.

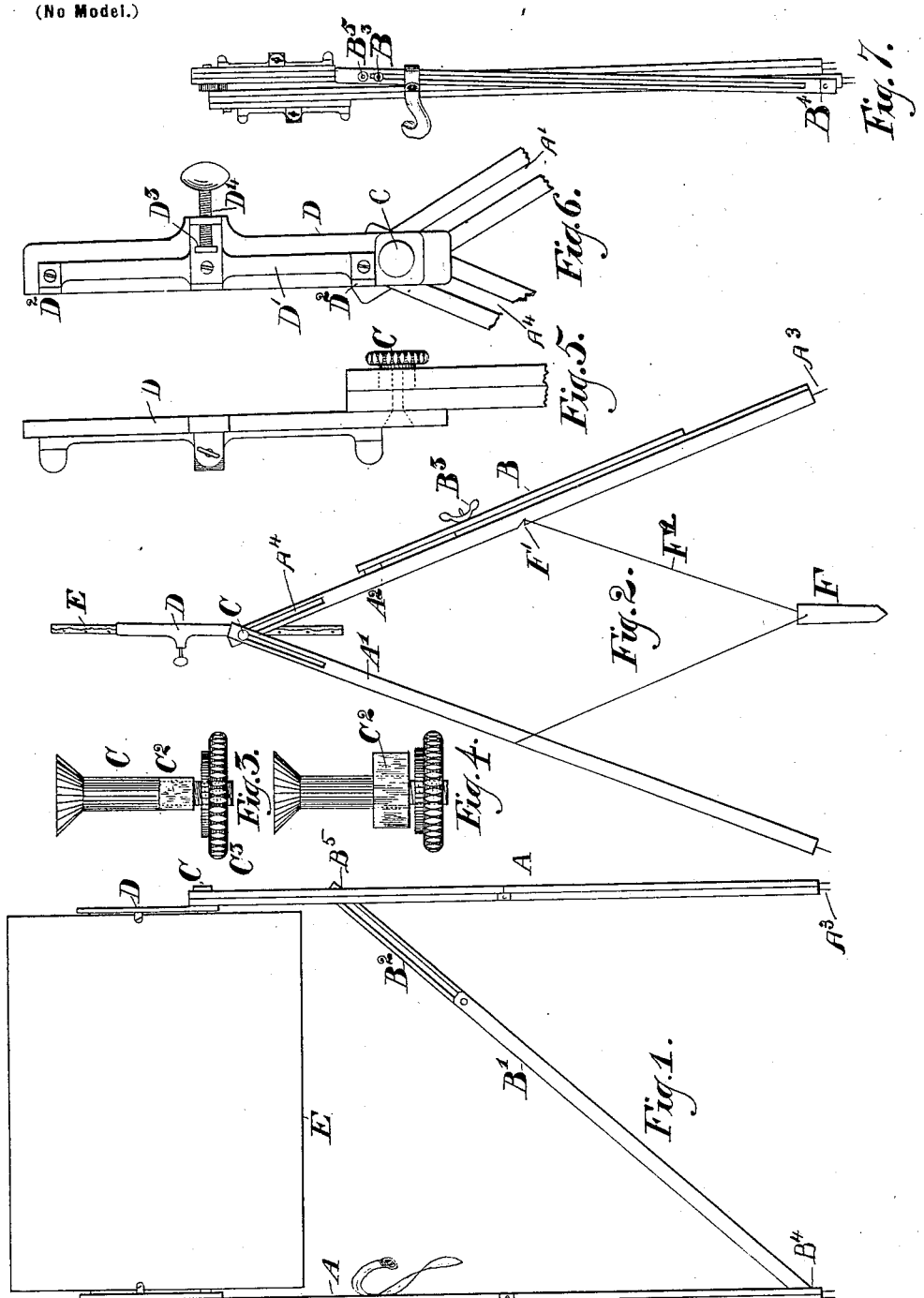

EDMOND DYONNET, OF MONTREAL, CANADA.

EASEL.

SPECIFICATION forming part of Letters Patent No. 650,504, dated May 29, 1900.

Application filed January 14, 1898. Serial No. 666,722. (No model.)

*To all whom it may concern:*

Be it known that I, EDMOND DYONNET, a citizen of the Republic of France, residing at Montreal, in the Province of Quebec and Dominion of Canada, have invented certain new and useful Improvements in Easels; and I do hereby declare the following to be a full, clear, and exact description of the invention, such as will enable others skilled in the art to which it appertains to make and use the same.

The invention relates to easels, and more particularly portable sketching-easels, and has for its objects lightness of construction, adjustability to size of drawing, stability on uneven ground, and rapidity and ease in varying the angle of drawing plane.

Sketching-easels have hitherto been constructed generally in the form of tripods, on which the drawing has been merely supported by a bracket. This had little stability and was easily disturbed, besides having no adjustability.

By means of this invention a frame of light weight is readily adjusted to a canvas or block of any size. This canvas or block may be arranged at any suitable height and every variation of slant to the surface of the same quickly obtained without disturbing the easel, which is firmly attached to the ground, if necessary.

The general construction is as follows: The apparatus consists in the two side standards, which may be connected by the extensible cross-bar and having adjustable pivoted clamping-frames adapted to hold the canvas or block in any desired position by means of adjustable pivots. The block or canvas when held by the clamps becomes an essential part of the frame of the easel. The form illustrated is that of a light sketching-easel which folds up readily and is very portable.

Reference is made to the annexed drawings, in which—

Figure 1 is a front view; Fig. 2, a side view opened; Figs. 3 and 4, details of pivot-pins; Figs. 5 and 6, details of clamp; Fig. 7, view of easel closed.

In the form shown by the drawings the side standards are composed of two pairs of legs A A. These may be provided at their lower ends with suitable spikes $A^3$. Toward their upper ends slots $A^4$ are made, through which the pivot-pins C pass. The rear legs $A^2$ are connected by the cross-bar B, which is pivotally attached near the top of one of these legs $A^2$ and near the bottom of the other. This bar can be lengthened or shortened according to the desired width of the easel by means of the thumb-screw $B^3$ and the slot-piece $B^2$.

The cross-bar is not necessary when the side standards connected by the canvas or block form a sufficiently-rigid easel.

The clamping-frames D are pivoted at one end on the pivot-pins C and consist in a main part D, on which is secured on the inside the clamp D′, having a series of lugs $D^2$ and the adjustable thumb-screw $D^4$, with a loose washer $D^3$, the lug $D^{21}$ opposite which is toothed to give a firm grip to the clamp. The pivot-pins C are made with the flat portion $C^2$, which fits the slot $A^4$.

The operation of the device is as follows: The canvas or block E is clamped on either side by the clamps D, the thumb-screw $B^3$ being loose to permit the standards A to separate readily. It is then tightened, and the frame is rigid. The canvas or block E can then be turned on the pivots C, so that its surface takes the required slant. Should the ground be uneven, the length of the legs A can be adjusted by means of their pins C, traveling in the slots $A^4$. A cord $F^2$, attached to the middle of one leg, passing through a hole in a peg F, driven into the ground, and fastened in a slot F′ in the other leg, makes the easel very steady and firm. It is thus seen that the canvas or block itself becomes part of the easel, and thereby reduces the weight of the frame, besides giving greater freedom of action.

Having now described my invention, what I claim as new, and desire to secure by Letters Patent, is—

1. In a portable easel, the combination with folding legs, of an extensible cross-bar connecting the legs below their pivots and at different distances therefrom and adapted to fold close to the legs when the easel is closed, clamps to grip the opposite sides of a block or canvas, and pivoted to revolve with the block or canvas between the legs, and to fold close to the legs when the easel is closed.

2. In a portable easel, the combination of two pairs of folding legs, with an extensible cross-bar pivoted to the opposite end of the corresponding leg of each pair, and folding close to the legs when the easel is closed, clamps to grip the opposite sides of a block or canvas, pivoted to revolve therewith between the pairs of legs, and pivot-pins with screw-nuts to retain the clamps in any position, the whole adapted to be folded as shown and described.

3. In a portable easel, the combination of two pairs of folding legs, with an extensible cross-bar connecting the opposite end of the corresponding leg of each pair, clamps to grip the opposite sides of a block or canvas, pivoted to revolve therewith between the pairs of legs, and pivot-pins forming the pivots of one pair of legs and of one clamp, and screw-nuts to tighten the pivots and retain the clamps as desired, as shown and described.

In witness whereof I have affixed my signature in presence of two witnesses.

EDMOND DYONNET.

Witnesses:
HANBURY A. BUDDEN,
A. L. CARON.